(12) United States Patent
Saito et al.

(10) Patent No.: US 6,830,726 B2
(45) Date of Patent: Dec. 14, 2004

(54) METHOD OF STERILIZING A RADIATION-RESISTANT MEDICAL ADHESIVE PRODUCT

(75) Inventors: Rui Saito, Saitama (JP); Eiji Suzuki, Saitama (JP); Hideaki Okabe, Kanagawa (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/963,425

(22) Filed: Sep. 27, 2001

(65) Prior Publication Data

US 2002/0064670 A1 May 30, 2002

(30) Foreign Application Priority Data

Oct. 10, 2000 (JP) ........................................ 2000-309665

(51) Int. Cl.$^7$ ................................................. A61L 2/08
(52) U.S. Cl. ..................... 422/22; 427/2.1; 428/41.3; 428/41.5; 522/71; 522/79; 522/152; 522/153; 522/154; 523/111; 523/125
(58) Field of Search ........................... 422/22; 427/2.1; 428/41.3, 41.5; 522/71, 79, 152, 153, 154; 523/125, 111; 524/556, 271, 272

(56) References Cited

U.S. PATENT DOCUMENTS

| | | | | | |
|---|---|---|---|---|---|
| 3,823,255 | A | * | 7/1974 | Batz ............................ | 341/34 |
| 4,114,617 | A | * | 9/1978 | Turner et al. ............... | 604/186 |
| 4,328,274 | A | * | 5/1982 | Tarbutton et al. ........... | 428/142 |
| 4,373,046 | A | * | 2/1983 | Hagiwara et al. ........... | 524/285 |
| 4,400,486 | A | * | 8/1983 | Iwata et al. ................. | 525/192 |
| 4,456,741 | A | * | 6/1984 | Ames ................... | 428/355 AC |
| 4,615,947 | A | * | 10/1986 | Goossens ..................... | 428/412 |
| 4,683,169 | A | * | 7/1987 | Curry et al. ................. | 428/337 |
| 4,726,982 | A | * | 2/1988 | Traynor et al. ............. | 428/213 |
| 4,988,742 | A | * | 1/1991 | Moon et al. ................... | 522/16 |
| 5,045,396 | A | * | 9/1991 | Lin et al. ..................... | 428/412 |
| 5,130,375 | A | * | 7/1992 | Bernard et al. ........... | 427/208.4 |
| 5,199,979 | A | * | 4/1993 | Lin et al. ................ | 106/287.14 |
| 5,204,390 | A | * | 4/1993 | Szymanski et al. ........... | 524/91 |
| 5,229,447 | A | * | 7/1993 | Miyajima et al. ............ | 524/377 |
| 5,232,787 | A | * | 8/1993 | Gotoh et al. ................. | 428/523 |
| 5,318,835 | A | * | 6/1994 | Sawamoto et al. ...... | 428/317.7 |
| 5,385,964 | A | * | 1/1995 | Basil et al. .................. | 524/266 |
| 5,429,590 | A | * | 7/1995 | Saito et al. ..................... | 602/48 |
| 5,596,028 | A | * | 1/1997 | Yanagi et al. ................ | 523/176 |
| 5,624,483 | A | * | 4/1997 | Fujioka .................... | 106/31.29 |
| 5,695,837 | A | * | 12/1997 | Everaerts et al. .......... | 428/40.1 |
| 5,707,703 | A | * | 1/1998 | Rothrum et al. ........... | 428/40.1 |
| 5,876,855 | A | * | 3/1999 | Wong et al. .......... | 428/355 BL |
| 5,908,693 | A | * | 6/1999 | Delgado et al. ............. | 428/343 |
| 5,998,018 | A | * | 12/1999 | Murakami et al. .......... | 428/343 |
| 6,106,904 | A | * | 8/2000 | Strotmann et al. .......... | 427/491 |
| 6,120,866 | A | * | 9/2000 | Arakawa et al. ............ | 428/40.1 |
| 6,198,016 | B1 | * | 3/2001 | Lucast et al. ................. | 602/41 |
| 6,312,799 | B1 | * | 11/2001 | Hosokawa et al. ......... | 428/345 |
| 6,416,858 | B1 | * | 7/2002 | Ercillo et al. ............... | 428/345 |

FOREIGN PATENT DOCUMENTS

| | | | |
|---|---|---|---|
| EP | 0 342 808 | * | 11/1989 |
| JP | 59-018774 | * | 1/1984 |
| JP | 361276874 A | * | 12/1986 |
| JP | 408041434 A | * | 2/1996 |
| JP | 408143847 | * | 6/1996 |
| JP | 09316417 A | * | 12/1997 |

* cited by examiner

*Primary Examiner*—Judy M. Reddick
(74) *Attorney, Agent, or Firm*—Oblon, Spivak, McClelland, Maier & Neustadt, P.C.

(57) ABSTRACT

This invention relates to a radiation-resistant acrylic adhesive composition with less reduction in the adhesion thereof upon irradiation with radiations, which composition comprises an acrylic polymer and a radiation-resistant agent, and a radiation-resistant adhesive product comprising the composition.

6 Claims, No Drawings

METHOD OF STERILIZING A RADIATION-RESISTANT MEDICAL ADHESIVE PRODUCT

BACKGROUND OF THE INVENTION

The present invention relates to a radiation-resistant adhesive composition and in particular to a radiation-resistant adhesive composition suitably used in medical adhesive products sterilized by radiations (γ-rays, electron rays), such as adhesive tapes, adhesive plasters, surgical drapes and packaging materials for medical instruments, as well as a radiation-resistant adhesive product comprising the same.

For medical instruments, a method of sterilization with an ethylene oxide gas is mainly used at present. In recent years, however, a method of sterilization with radiations (γ-rays, electron rays) came to be used in place of the method because of the problem of a residual gas. Upon sterilization with radiations, adhesive products comprising an acrylic adhesive had the problem of a reduction in the adhesion thereof after irradiation with radiations as compared with the adhesion before irradiation, that is, the adhesion of adhesive tapes, adhesive plasters or surgical drapes comprising an acrylic adhesive became lower than predetermined adhesion, or adhesive labels stuck on medical instruments were easily released.

OBJECTS AND SUMMARY OF THE INVENTION

The object of the present invention is to provide an acrylic adhesive with less reduction in the adhesion thereof upon irradiation with radiations and an adhesive product comprising the same.

The present invention encompasses:

(1) A radiation-resistant acrylic adhesive composition comprising an acrylic polymer and a radiation-resistant agent.
(2) The radiation-resistant acrylic adhesive composition according to item (1) above, wherein the amount (solid content) of the radiation-resistant agent is 5 to 100 parts by weight relative to 100 parts (solid content) by weight of the acrylic polymer.
(3) A radiation-resistant adhesive product comprising the radiation-resistant acrylic adhesive composition described in item (1) or (2) above.
(4) The radiation-resistant adhesive product according to item (3) above, wherein the adhesion thereof after irradiation with 60 kGy electron rays, as determined in accordance with JIS (Japanese Industrial Standard) Z0237, is 80 to 100% of the adhesion thereof before irradiation.

The radiation-resistant agent used in the present invention refers to a compound which can compensate for the reduction in adhesion (due to an increase in the degree of crosslinkage) attributable to irradiation with radiations and which is compatible with an acrylic adhesive (which comprises an acrylic polymer and optional components).

The radiation-resistant agent includes e.g. rosin, rosin derivatives (e.g., modified rosin such as hydrogenated rosin, disproportionated rosin, polymerized rosin etc., and modified rosin esters thereof, terpene resin, terpene phenol resin, aromatic modified terpene resin, hydrogenated terpene resin, aliphatic petroleum resin, aromatic petroleum resin, copolymerized petroleum resin, alicyclic petroleum resin, hydrogenated petroleum resin and alkyl phenol resin.

The amount (solid content) of the radiation-resistant agent compounded is usually 5 to 100 parts by weight, preferably 10 to 80 parts by weight, relative to 100 parts (solid content) by weight of an acrylic polymer in the acrylic adhesive composition.

Although alkyl (meth)acrylates used as the major component in starting monomers for the acrylic polymer in the present invention are not particularly limited, it is usually possible to use various alkyl acrylates or alkyl methacrylates wherein the alkyl group constituting an ester group is a $C_{1-18}$ alkyl group, and specific examples include methyl acrylate, ethyl acrylate, propyl acrylate, n-butyl acrylate, isobutyl acrylate, 2-ethylhexyl acrylate, isooctyl acrylate, methyl methacrylate, ethyl methacrylate, propyl methacrylate, n-butyl methacrylate, isobutyl methacrylate, 2-ethylhexyl methacrylate, isooctyl methacrylate etc.

As the monomers constituting the acrylic polymer in the present invention, the above-enumerated alkyl (meth)acrylates may be used alone or in combination thereof or may be used in combination with other copolymerizable monomers. As the other copolymerizable monomers, use can be made of a wide variety of monomers known as modifying monomers for acrylic adhesive, such as vinyl acetate, styrene, acrylonitrile, acrylamide, dimethylacrylamide, acrylic acid, methacrylic acid, 2-hydroxyethyl acrylate, glycidyl methacrylate, 4-hydroxybutyl acrylate and N-vinylpyrrolidone.

Polymerization of these monomers is carried out by a conventional polymerization method such as solution polymerization, emulsion polymerization and bulk polymerization. The reaction temperature for polymerization is usually 50 to 85° C., preferably 60 to 80° C.

When solution polymerization is carried out, the monomers are polymerized at a concentration (as solid content) of usually 0.5 to 60% by weight, preferably 5 to 50% by weight in the presence of a polymerization initiator such as 2,2'-azobisisobutyronitrile or benzoyl peroxide in a solvent such as acetone, benzene, toluene, ethyl acetate, hexane, heptane, methanol, ethanol or isopropanol.

The amount (solid content) of the polymerization initiator compounded is usually 0.05 to 1 part by weight based on 100 parts (solid content) by weight of the acrylic polymer.

A crosslinking agent (curing agent), for example, an isocyanate compound such as hexamethylenediisocyanate and tolylenediisocyanate; an epoxy compound such as 1,3-bis(N,N-diglycidylaminomethyl) toluene and N,N,N',N'-tetraglycidyl-4,4'-diaminodiphenylmethane; a metal chelate compound such as tris(ethylacetoacetato)aluminum and ethylacetoacetatoaluminum diisopropylate; and an imine compound such as N,N'-toluene-2,4-bis(1-aziridinecarboxyamido)triethylenemelamine and hexamethylene diethylene urea can also be added to the radiation-resistant acrylic adhesive composition of the present invention.

The amount (solid content) of the crosslinking agent compounded is usually 0.05 to 5 parts by weight, preferably 0.1 to 3 parts by weight, relative to 100 parts (solid content) by weight of the acrylic polymer.

If necessary, the radiation-resistant acrylic adhesive composition of the present invention can be compounded with a softener such as process oil, polyisobutylene and polybutene; fillers such as titanium oxide, zinc oxide, aluminum metasilicate, calcium carbonate and calcium phosphate; a moisture retaining agent such as starch, cellulose derivatives and polyvinyl alcohol; and liquid paraffin.

The radiation-resistant adhesive product of the present invention encompasses adhesive tapes, adhesive plasters, adhesive sheets, adhesive labels, adhesive packaging bags, and can be obtained by applying the adhesive composition onto a substrate or a release sheet to form an adhesive layer thereon.

The thickness of the adhesive layer in the radiation-resistant adhesive product of the present invention is usually 5 to 200 μm, preferably 10 to 100 μm.

The substrate used in the radiation-resistant adhesive product of the present invention is not particularly limited, and for example, use is made of a resin film made of polyesters (e.g., polyethylene terephthalate), polyethylene, polypropylene, polyvinyl chloride, polycarbonates, ethylene-vinyl acetate copolymers, polyurethane, polystyrene or polyimides, or paper, synthetic paper, cloth, metal foil etc.

The thickness of such a substrate is usually 5 to 1000 μm, preferably 20 to 500 μm.

In addition, the adhesive product may have a release sheet laminated on the surface of the adhesive layer provided on the substrate in order to protect the adhesive layer. As the release sheet, for example a sheet having a releasing treatment layer such as silicone resin provided on a sheet material selected from the above-described substrates is used.

Further, the radiation-resistant adhesive product of the present invention may be in such a form that the above-described substrate is not used. In this case, the adhesive product is used in such a form that the adhesive layer is protected in both sides thereof with release sheets.

For production of the radiation-resistant adhesive product of the present invention, a compound of the above-described adhesive composition is mixed, stirred and applied onto the above-described substrate or release sheet by a known coater such as knife coater, roll knife coater, reverse roll coater, gravure coater or die coater, to form a layer of desired thickness thereon. If the compound is a solution, a suspension or the like, it is dried to remove volatiles such as solvent etc., to form an adhesive layer. Then, another release sheet or substrate is laminated on the side of the exposed adhesive layer to produce the radiation-resistant adhesive product of the present invention.

In the measurement of adhesion before and after irradiation with electron rays (radiation dose: 60 kGy) in accordance with JIS Z0237, a conventional adhesive sheet not compounded with the radiation-resistant agent, after irradiation with electron rays, indicates about 70% of the adhesion thereof before irradiation with electron rays, that is, about 30% reduction of the adhesion, whereas the adhesive sheet of the present invention compounded with the radiation-resistant agent, after irradiation with electron rays, maintains 80 to 100% of the adhesion thereof before irradiation.

The radiation-resistant adhesive product of the present invention can be suitably used as e.g. first-aid adhesive tapes, first-aid adhesive plasters, surgical drapes, or adhesive labels to be stuck on medical instruments.

According to the present invention, there can be provided an acrylic adhesive composition with less reduction in the adhesion thereof before and after a process of sterilization with radiation (γ-rays, electron rays), as well as a adhesive product comprising the same.

This specification includes part or all of the contents as disclosed in the specification of Japanese Patent Application No. 2000-309665, which is the base of the priority claim of the present application.

DETAILED DESCRIPTION OF THE PREFERRED EMBODIMENTS

Hereinafter, the present invention is described in more detail by reference to the Examples and Comparative Example, which are not intended to limit the scope of the present invention.

EXAMPLE 1

0.25 part by weight of 2,2'-azobisisobutyronitrile was added as a polymerization initiator to a mixed solution of 65 parts by weight of n-butyl acrylate, 32 parts by weight of 2-ethylhexyl acrylate, 3 parts by weight of acrylic acid and 50 parts by weight of ethyl acetate, and while 80 parts by weight of ethyl acetate was further added thereto, the mixture was subjected to polymerization at 65° C. for 12 hours in an inert gas atmosphere, to prepare a solution of acrylic adhesive composition (solid content: 43.5%).

The solution of acrylic adhesive composition thus obtained was mixed with hexamethylene diethylene urea (crosslinking agent based on an organic polyvalent imine) and hydrogenated rosin ester (ultra-pale rosin ester KE-311™ produced by Arakawa Chemical Industries, Ltd.) in amounts of 0.2 weight part (solid content) and 40 weight parts respectively relative to 100 weight parts (solid content) of the acrylic adhesive composition in the solution, and the mixture was stirred to prepare a solution of acrylic adhesive composition.

The above solution of acrylic adhesive composition was applied in a coating amount of 30 g/m² after drying onto a polyethylene terephthalate film (thickness, 25 μm) and dried at 100° C. for 2 minutes to form an adhesive layer of 30 μm in thickness which was then superposed on a release sheet (SP-KP85G White™ produced by Lintec Corporation), to give the adhesive sheet of the present invention having the polyethylene terephthalate film as the substrate.

EXAMPLE 2

An adhesive sheet was obtained in the same manner as in Example 1 except that 40 parts by weight of hydrogenated terpene resin (CLEARON K-100™ produced by Yasuhara Chemical Co., Ltd.) was added and mixed in place of the hydrogenated rosin ester in Example 1.

EXAMPLE 3

An adhesive sheet was obtained in the same manner as in Example 1 except that 40 parts by weight of aliphatic petroleum resin (Escorez 1202u™ produced by TONEX Co., Ltd.) was added and mixed in place of the hydrogenated rosin ester in Example 1.

EXAMPLE 4

An adhesive sheet was obtained in the same manner as in Example 1 except that 40 parts by weight of hydrogenated petroleum resin (ARKON P-100™ produced by Arakawa Chemical Industries, Ltd.) was added and mixed in place of the hydrogenated rosin ester in Example 1.

COMPARATIVE EXAMPLE 1

An adhesive sheet was obtained in the same manner as in Example 1 except that the hydrogenated rosin ester was not compounded.

The adhesive sheets in the Examples and Comparative Example were measured for their adhesion to a Bakelite™ (phenol resin) plate used as adherend before and after irradiation with electron rays (radiation dose: 20, 40, 60 kGy) in accordance with JIS Z0237. The results are shown in Tables 1 and 2.

TABLE 1

Measurement results of adhesion (N/19 mm)

| Radiation dose (kGy) | Example 1 | Example 2 | Example 3 | Example 4 | Comparative Example 1 |
|---|---|---|---|---|---|
| 0 | 9.9 | 7.2 | 6.2 | 5.5 | 7.0 |
| 20 | 9.7 | 7.2 | 6.0 | 5.2 | 5.9 |
| 40 | 9.6 | 7.0 | 6.0 | 5.1 | 5.2 |
| 60 | 9.0 | 7.0 | 6.0 | 4.8 | 4.9 |

TABLE 2

Measurement results of adhesion (ratio (%) of the adhesion after irradiation to the adhesion (=100%) before irradiation)

| Radiation dose (kGy) | Example 1 | Example 2 | Example 3 | Example 4 | Comparative Example 1 |
|---|---|---|---|---|---|
| 0 | 100.0 | 100.0 | 100.0 | 100.0 | 100.0 |
| 20 | 97.9 | 100.0 | 96.7 | 94.5 | 84.2 |
| 40 | 97.9 | 97.2 | 96.7 | 92.7 | 74.2 |
| 60 | 90.9 | 97.2 | 96.7 | 87.2 | 70.0 |

The adhesive sheets in Example 1 and Comparative Example 1 were measured for their adhesion to other adherends, that is, a polypropylene plate (PP), a glass plate and a stainless steel plate (SUS) before and after irradiation with electron rays (radiation dose: 60 kGy) in accordance with JIS Z0237. The results are shown in Tables 3 and 4.

TABLE 3

Measurement results of adhesion (N/19 mm)

| | Radiation dose (kGy) | PP | Glass | SUS |
|---|---|---|---|---|
| Comparative Example 1 | 0 kGy | 4.9 | 7.5 | 8.3 |
| | 60 kGy | 3.6 | 5.2 | 6.1 |
| Example 1 | 0 kGy | 9.6 | 12.8 | 13.2 |
| | 60 kGy | 9.5 | 12.2 | 12.9 |

TABLE 4

Measurement results of adhesion (ratio (%) of the adhesion after irradiation to the adhesion (= 100%) before irradiation)

| | Radiation dose (kGy) | PP | Glass | SUS |
|---|---|---|---|---|
| Comparative Example 1 | 0 kGy | 100 | 100 | 100 |
| | 60 kGy | 73.5 | 69.3 | 73.5 |
| Example 1 | 0 kGy | 100 | 100 | 100 |
| | 60 kGy | 99.0 | 95.3 | 97.7 |

As is evident from the tables, the adhesive sheet in Comparative Example 1 not compounded with the radiation-resistant agent showed a significant reduction in the adhesion thereof upon irradiation with electron rays, while the adhesive sheets in the Examples compounded with the radiation-resistant agent showed little reduction in the adhesion thereof upon irradiation.

All the publications, patents and patent applications cited herein are incorporated herein by reference in their entirety.

What is claimed is:

1. A method for sterilizing a radiation-resistant medical adhesive product comprising an acrylic polymer, a cross linking agent, and a radiation-resistant agent selected from the group consisting of rosin, a hydrogenated rosin, a disproportionated rosin, a polymerized rosin, a modified rosin ester, terpene resin, terpene phenol resin, aromatic modified terpene resin, hydrogenated terpene resin, aliphatic petroleum resin, aromatic petroleum resin, copolymerized petroleum resin, alicyclic petroleum resin, hydrogenated petroleum resin and alkyl phenol resin, wherein said method comprises sterilizing said radiation-resistant medical adhesive product with radiation wherein said radiation is with either γ-rays or electron rays.

2. The method according to claim 1, wherein said radiation is with γ-rays.

3. The method according to claim 1, wherein said radiation is with electron rays.

4. The method according to claim 1, wherein the solid content of the radiation-resistant agent is 5 to 100 parts by weight relative to 100 parts by weight solid content of the acrylic polymer.

5. The method according to claim 1, wherein adhesion of the adhesive product after irradiation with 60 kGy dose of electron rays, as determined in accordance with JIS Z0237, is 80 to 100% of that adhesion of the adhesive product before irradiation.

6. The method according to claim 1, wherein the adhesive product is selected from the group consisting of adhesive tapes, adhesive plasters, adhesive sheets, adhesive labels, adhesive packaging bags, first-aid adhesive tapes, first-aid adhesive plasters and surgical drapes.

* * * * *